United States Patent
Zhang

(10) Patent No.: US 10,506,612 B2
(45) Date of Patent: Dec. 10, 2019

(54) METHODS AND DEVICE FOR AUTHORIZATION BETWEEN A CUSTOMER DEVICE AND CONNECTIVITY MANAGER

(71) Applicant: Huawei Technologies Co., Ltd., Shenzhen (CN)

(72) Inventor: Hang Zhang, Nepean (CA)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 15/363,754

(22) Filed: Nov. 29, 2016

(65) Prior Publication Data

US 2017/0079053 A1  Mar. 16, 2017

Related U.S. Application Data

(63) Continuation of application No. 14/297,073, filed on Jun. 5, 2014, now Pat. No. 9,532,266.

(Continued)

(51) Int. Cl.
*H04W 72/08* (2009.01)
*H04W 64/00* (2009.01)
(Continued)

(52) U.S. Cl.
CPC ........... *H04W 72/085* (2013.01); *H04L 41/12* (2013.01); *H04L 41/5067* (2013.01);
(Continued)

(58) Field of Classification Search
CPC ............... H04W 72/085; H04W 64/00; H04W 56/0025; H04W 48/16; H04W 24/08;
(Continued)

(56) References Cited

U.S. PATENT DOCUMENTS 8,326,969 B1   12/2012  Batra et al.
2002/0095493 A1   7/2002  Byrnes
(Continued)

FOREIGN PATENT DOCUMENTS

CN   102149161 A   8/2011
CN   102771095 A   11/2012
(Continued)

OTHER PUBLICATIONS

Villapol et al. "A Proposal to Improve Network Throughput Using a QoS Building Blocks Approach at Central University of Venezuela," 2005, [retrieved on Apr. 26, 2016], Retrieved from the Internet: <URL: www.ciens.ucv.ve/mvillap/Papers!VillapoiGamessMorales1-Final.pdf> ACM 1-59593-008-6 /05/0010.

(Continued)

*Primary Examiner* — Omar J Ghowrwal
(74) *Attorney, Agent, or Firm* — Slater Matsil, LLP

(57) ABSTRACT

An embodiment method of managing a wireless network includes managing an infrastructure topology for the wireless network. The wireless network includes a plurality of network nodes. The method further includes managing a connection of a user equipment (UE) to the wireless network. The method further includes managing a customer service provided to the UE over the connection. The method also includes managing analytics for the wireless network and the service.

27 Claims, 15 Drawing Sheets

Related U.S. Application Data

(60) Provisional application No. 61/831,471, filed on Jun. 5, 2013.

(51) Int. Cl.

| | | |
|---|---|---|
| *H04W 56/00* | (2009.01) | |
| *H04W 48/16* | (2009.01) | |
| *H04W 24/08* | (2009.01) | |
| *H04W 28/02* | (2009.01) | |
| *H04L 12/24* | (2006.01) | |
| *H04W 24/02* | (2009.01) | |
| *H04W 16/08* | (2009.01) | |

(52) U.S. Cl.
CPC .......... *H04W 24/02* (2013.01); *H04W 24/08* (2013.01); *H04W 28/0226* (2013.01); *H04W 48/16* (2013.01); *H04W 56/0025* (2013.01); *H04W 64/00* (2013.01); *H04L 41/0816* (2013.01); *H04W 16/08* (2013.01)

(58) Field of Classification Search
CPC . H04W 28/0226; H04W 24/02; H04W 16/08; H04L 41/5067; H04L 41/12; H04L 41/0816
See application file for complete search history.

(56) References Cited

U.S. PATENT DOCUMENTS

| | | | |
|---|---|---|---|
| 2002/0101822 A1 | 8/2002 | Ayyagari et al. | |
| 2005/0047335 A1 | 3/2005 | Cheng et al. | |
| 2008/0045234 A1 | 2/2008 | Reed | |
| 2008/0056133 A1 | 3/2008 | Deshpande et al. | |
| 2008/0102853 A1 | 5/2008 | Kagimoto et al. | |
| 2009/0052361 A1* | 2/2009 | Cai | H04L 1/18 370/311 |
| 2009/0225762 A1 | 9/2009 | Davidson et al. | |
| 2010/0208694 A1* | 8/2010 | Kumai | H04W 68/12 370/331 |
| 2010/0214917 A1 | 8/2010 | Yang et al. | |
| 2011/0188457 A1 | 8/2011 | Shu et al. | |
| 2011/0306304 A1* | 12/2011 | Forutanpour | G06F 3/04883 455/67.11 |
| 2012/0054347 A1 | 3/2012 | Lee et al. | |
| 2012/0087303 A1* | 4/2012 | Kwon | H04W 48/10 370/328 |
| 2013/0058227 A1 | 3/2013 | Lemieux | |
| 2013/0058357 A1 | 3/2013 | Koponen et al. | |
| 2013/0182622 A1 | 7/2013 | Lin et al. | |
| 2014/0198641 A1 | 7/2014 | Perkuhn et al. | |
| 2014/0269327 A1 | 9/2014 | Fulknier et al. | |
| 2016/0057807 A1* | 2/2016 | Tirronen | H04W 76/04 370/311 |
| 2017/0374608 A1* | 12/2017 | Li | H04W 48/08 |

FOREIGN PATENT DOCUMENTS

| | | | |
|---|---|---|---|
| CN | 103069783 | A | 4/2013 |
| EP | 2389034 | A1 | 11/2011 |
| EP | 2405629 | A1 | 1/2012 |
| JP | 2007104245 | A | 4/2007 |
| JP | 2008118171 | A | 5/2008 |
| JP | 2008187305 | A | 8/2008 |
| JP | 2010503286 | A | 1/2010 |
| JP | 2011193163 | A | 9/2011 |
| JP | 2012503957 | A | 2/2012 |
| WO | 2011094083 | A2 | 8/2011 |
| WO | 2012021320 | A1 | 2/2012 |
| WO | 2013055538 | A1 | 4/2013 |

OTHER PUBLICATIONS

3rd Generation Partnership Project; Technical Specification Group Services and System Aspects; Telecommunication management; Principles and high level requirements (Release 11), 3GPP TS 32.101, V11.1.0, Dec. 2012, 67 pages.

3GPP TS 23.401 V12.0.0, 3rd Generation Partnership Project; Technical Specification Group Services and System Aspects; General Packet Radio Service (GPRS) enhancements for Evolved Universal Terrestrial Radio Access Network (E-UTRAN) access (Release 12); Mar. 2013, 289 pages.

* cited by examiner

METHODS AND DEVICE FOR AUTHORIZATION BETWEEN A CUSTOMER DEVICE AND CONNECTIVITY MANAGER

CROSS-REFERENCE TO RELATED APPLICATIONS

This application is a continuation of U.S. patent application Ser. No. 14/297,073, titled "System and Methods for Managing a Wireless Network," filed on Jun. 5, 2014, (now U.S. Patent No. 9,532,266, issued on Dec. 27, 2016), which claims the benefit of U.S. Provisional Application No. 61/831,471, titled "Framework for Management Plane Functionality and Interfaces," filed on Jun. 5, 2013, which applications are hereby incorporated herein by reference.

TECHNICAL FIELD

The present invention relates generally to wireless network architecture and, in particular embodiments, to a system and method for managing a wireless network.

BACKGROUND

Driven largely by smart phones, tablets, and video streaming, the amount of wireless data handled by wireless networks has risen markedly and is expected to continue to rise by orders of magnitude over the next ten years. In addition to the sheer volume of data, the number of devices is expected to continue to grow exponentially, possibly reaching into the billions of devices, along with radically higher data rates. Different applications will place different requirements on the performance of future wireless networks. Future wireless networks are expected to be highly flexible, highly efficient, open, and customizable for customers and consumers.

SUMMARY

An embodiment method of managing a wireless network includes managing an infrastructure topology for the wireless network. The wireless network includes a plurality of network nodes. The method further includes managing a connection of a user equipment (UE) to the wireless network. The method further includes managing a customer service provided to the UE over the connection. The method also includes managing analytics for the wireless network and the service.

An embodiment computing system for managing a wireless network includes a customer service manager, a connectivity manager, a data analyzer, and an infrastructure manager. The customer service manager is configured to authorize access to the wireless network by UEs according to respective customer service information. The customer service manager is further configured to negotiate a respective quality of experience (QoE) for each of the UEs according to respective locations of the UEs, the respective customer service information, and respective session requests for which respective virtual networks (VNs) are established by a control plane. The connectivity manager is configured to track respective locations of the UEs and update the respective VNs to which the UEs are connected. The data analyzer is configured to generate a congestion and traffic report according to network status reports received periodically from network nodes attached to the wireless network. The data analyzer is further configured to generate a QoE status according to QoE reports received periodically from the UEs. The infrastructure manager is configured to adapt a topology for the wireless network according to the topology and the congestion and traffic report.

An embodiment communication system includes a control plane, a data plane, and a management plane. The control plane is configured to make network resource management decisions for customer service traffic over a wireless network. The data plane includes network nodes arranged in a topology and configured to forward network traffic according to the traffic management decisions. The management plane includes a customer service manager, a connectivity manager, a data analyzer, and an infrastructure manager. The customer service manager is configured to authorize access to the wireless network by UEs according to respective customer service information. The customer service manager is further configured to negotiate a respective QoE for each of the UEs according to respective locations of the UEs, the respective customer service information, and respective session requests for which respective VNs are established by the control plane. The connectivity manager is configured to track respective locations of the UEs and update the respective VNs to which the UEs are connected. The data analyzer is configured to generate a congestion and traffic report according to network status reports received periodically from the network nodes. The data analyzer is further configured to generate a QoE status according to QoE reports received periodically from the UEs. The infrastructure manager is configured to adapt the topology according to the topology and the congestion and traffic report.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Figure 1:
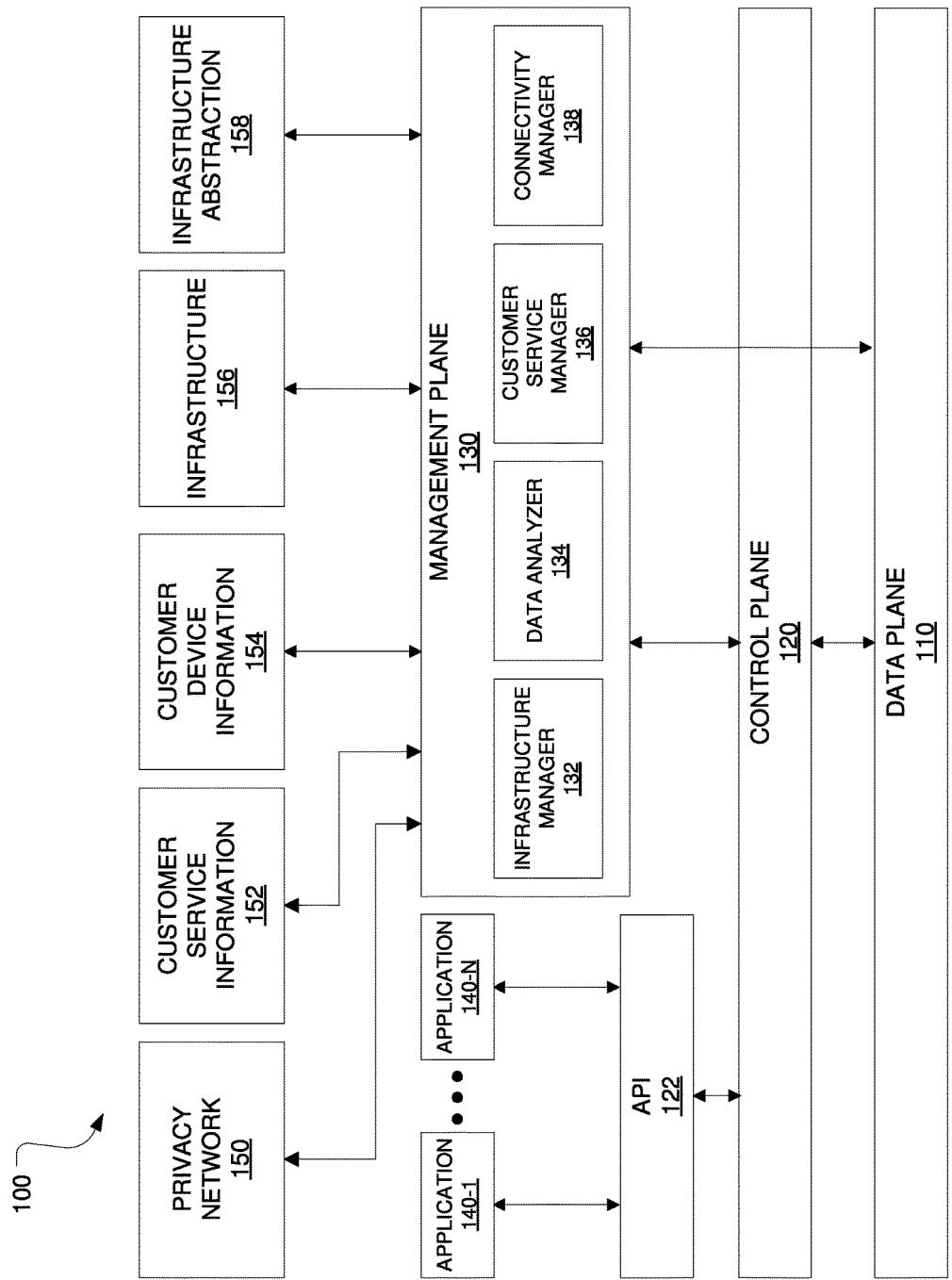
FIG. 1 is a block diagram of one embodiment of a logical functional architecture for a wireless network.

The making and using of embodiments are discussed in detail below. It should be appreciated, however, that the present invention provides many applicable inventive concepts that may be embodied in a wide variety of specific contexts. The specific embodiments discussed are merely illustrative of specific ways to make and use the invention, and do not limit the scope of the invention.

The advent of cloud-based networking has complicated the ability of future wireless networks to satisfy expected demands for higher throughput, lower latencies, lower energy, lower costs, and drastically more numerous connections. Cloud-based networking fundamentally redefines the endpoints and the time frame for which network services are provisioned. It requires the network be much more nimble, flexible, and scalable. Thus, technologies such as network function virtualization (NFV) and software defined networking (SDN) have become increasingly important in building future wireless networks. NFV enables network functions that are traditionally tied to hardware to run on a cloud computing infrastructure in a data center. Although the separation of the data plane, the control plane, and the management plane may not be feasible in the commercial cloud, the separation of those network functions from the hardware infrastructure will be a cornerstone of future wireless network architectures. One benefit is the ability to elastically support network functional demands. SDN is an architectural framework for creating intelligent programmable networks, where the control planes and the data planes are decoupled, network intelligence and state are logically centralized, and the underlying network infrastructure is abstracted from the application.

It is realized herein that a framework is needed for future wireless network operation that comprehends the prevalence of virtual networks and centralized control of resources. A virtual network (VN) is a collection of resources virtualized for a given service. It is realized herein that a framework of management plane functionality is needed to guide design and implementation of future wireless networks. It is further realized herein the framework can identify management plane functionality, include management plane interfaces, and include operation procedures. Management plane functionality can include infrastructure management, device connectivity management, customer service management, and status analysis management, among other functionality.

Infrastructure management functionality provides management capability for infrastructure topology adaptation according to network congestion and traffic load. Infrastructure management functionality allows integration of wireless networks of multiple providers. It also provides for spectrum management of a radio access network (RAN) and spectrum sharing among various co-located wireless networks. Infrastructure management also includes access (MAP) management and air interface management.

Device connectivity management functionality provides management capability for per-device attachment to the wireless network, including media access control (MAC) status, location tracking, and paging. Device connectivity management functionality includes defining customized and scenario-aware location tracking schemes. Device connectivity management functionality also provides for a software-defined and virtual per-mobile-user geographic location tracking entity and a triggering of user-specific data plane topology updates. Device connectivity management functionality also provides user-specific virtual network migration and location tracking as a service (LTaaS). A UE's location is relative to the network or, more specifically, relative to a set of potential network nodes that could provide network access to the UE. LTaaS provides UE location tracking and location information to the UE's home operator or a global UE location information management center, which is generally managed by a third party. The information can then be accessed and used by other operators, VN operators, and others.

Customer service management functionality provides management capability for customers' private information, authorization of device access, device security, and negotiation of service quality of experience (QoE). Customer service management functionality includes per-service QoE management as well as charging services. Customer service management functionality also provides customer specific context for connections and services. This includes QoE monitoring, charging, and billing.

Status analysis management functionality provides management capability for on-demand network status analysis and QoE assurance. More specifically, status analysis management functionality provides for management of on-demand network status analytics, management of on-demand service QoE status analytics, and data analytics as a service (DAaaS).

It is further realized herein the management plane functionality required in a wireless network can vary among devices and can depend on a device's state. The various devices in a wireless network include customer devices, i.e., user equipment (UE), and operator nodes, i.e., base stations or radio nodes. It is realized herein that a customer device can be powered on or off, and, while on, can be active or idle, all of which is referred to as the customer device's state. It is also realized herein that an operator node can also be powered on or off and, while on, can be active, idle, or inactive. Furthermore, an operator node's state can vary among its respective subsystems. For example, an operator node's access subsystem may be active, idle, or inactive while powered on, while the operator node's backhaul subsystem may be active or inactive. Similarly, the operator node's sensor subsystem may be active or inactive while powered on.

While in an active state, a UE continuously searches and monitors for feedback channel quality indicators (CQI). A continuous process is one that is carried out at every transmission interval. For example, if the transmission interval is 1 millisecond, then the UE searches and monitors periodically, where the period is 1 millisecond. The UE also continuously sends signals enabling uplink (UL) CQI estimation. On the network side, while the UE is active, a VN-active is established. The configuration of the VN-active depends on the UE's mobility, required QoE, and network status. Also, while the UE is active, the network maintains contexts above and below layer-2, including automatic repeat request (ARQ) and hybrid ARQ (HARQ) below; and flow/service ID mapping to ID defined in the access link (AL), location, states, authentication keys, sessions, and QoE above.

While in an idle state, the UE has an idle state ID and remains attached to the network. The UE continuously searches and monitors the network for measurement purposes and location updates. The UE may also perform mobility monitoring/tracking and location synchronization with the network. In certain embodiments, the UE carries out network monitoring conditionally. The UE also transmits and receives short data bursts without going back to active state. On the network side, while the UE is idle, a VN-idle is established. The configuration of the VN-idle depends on the UEs mobility, required QoE, and network status. The VN-idle can have no dedicated physical network resources or can have partially dedicated physical network resources, for example, between a user-specific virtual serving gateway (v-u-SGW) and other gateways (GWs).

FIG. 1 is a block diagram of one embodiment of a logical functional architecture 100 for a wireless network. Architecture 100 separates the wireless network into a data plane 110, a control plane 120, and a management plane 130. Data plane no transports network traffic among the various network nodes and UEs attached to the wireless network. Control plane 120 makes network resource assignment decisions for customer service traffic and transports control signals among the various network nodes and UEs. Management plane 130 provides various management and administrative functionality for the network. Interfaces exist among management plane 130, control plane 120, and data plane no, enabling each to carry out its respective functionality. Additionally, control plane 120 has an application programming interface (API) 122 that allows various applications 140-1 through 140-N to access control plane 120.

Architecture wo also includes various databases that are occasionally accessed by management plane 130 in carrying out its functionalities. These databases include a privacy network database 150, a customer service information database 152, a customer device information database 154, an infrastructure database 156, and an infrastructure abstraction database 158. Privacy network database 150 is a repository for topology information, node capabilities, states, and security information. Customer service information database 152 is a repository for authentication and security information related to customer devices, i.e., UEs. Customer device information database 154 is a repository for capabilities, locations, and states of customer devices. Infrastructure database 156 is a repository for network topology, node capabilities, and states. Infrastructure abstraction database 158 is a repository for various infrastructure abstractions within the wireless network.

In architecture 100, management plane 130 provides various functionalities through respective control blocks, including: an infrastructure manager 132, a data analyzer 134, a customer service manager 136, and a connectivity manager 138. Management plane 130, in certain embodiments, can provide additional functionalities, such as content service management, which is responsible for defining content caches in the radio access network (RAN), configuring cache-capable network nodes, and managing content forwarding.

Infrastructure manager 132 is responsible for integrating network nodes from various wireless network providers. Infrastructure manager 132 is also responsible for spectrum management for RAN backhaul links and access networks, as well as spectrum sharing among co-located wireless networks. Infrastructure manager 132 also provides access map management and air-interface management, among other functionalities. Data analyzer 134 is responsible for data analytics related to the wireless network. These analytics include managing on-demand network status, managing on-demand QoE, and providing data analytics as a service (DAaaS), among other functionalities. Customer service manager 136 is responsible for customer aspects of service, including QoE, charging, and customer information, among other functionalities. Connectivity manager 138 is responsible for location tracking and synchronization, pushing topology updates to users, VN migration, and providing location tracking as a service (LTaaS), among other functionalities.

Infrastructure manager 132, data analyzer 134, customer service manager 136, and connectivity manager 138 can be implemented in one or more processors, one or more application specific integrated circuits (ASICs), one or more field-programmable gate arrays (FPGAs), dedicated logic circuitry, or any combination thereof, all collectively referred to as a processor. The respective functions for Infrastructure manager 132, data analyzer 134, customer service manager 136, and connectivity manager 138 can be stored as instructions in non-transitory memory for execution by the processor.

Figure 2:
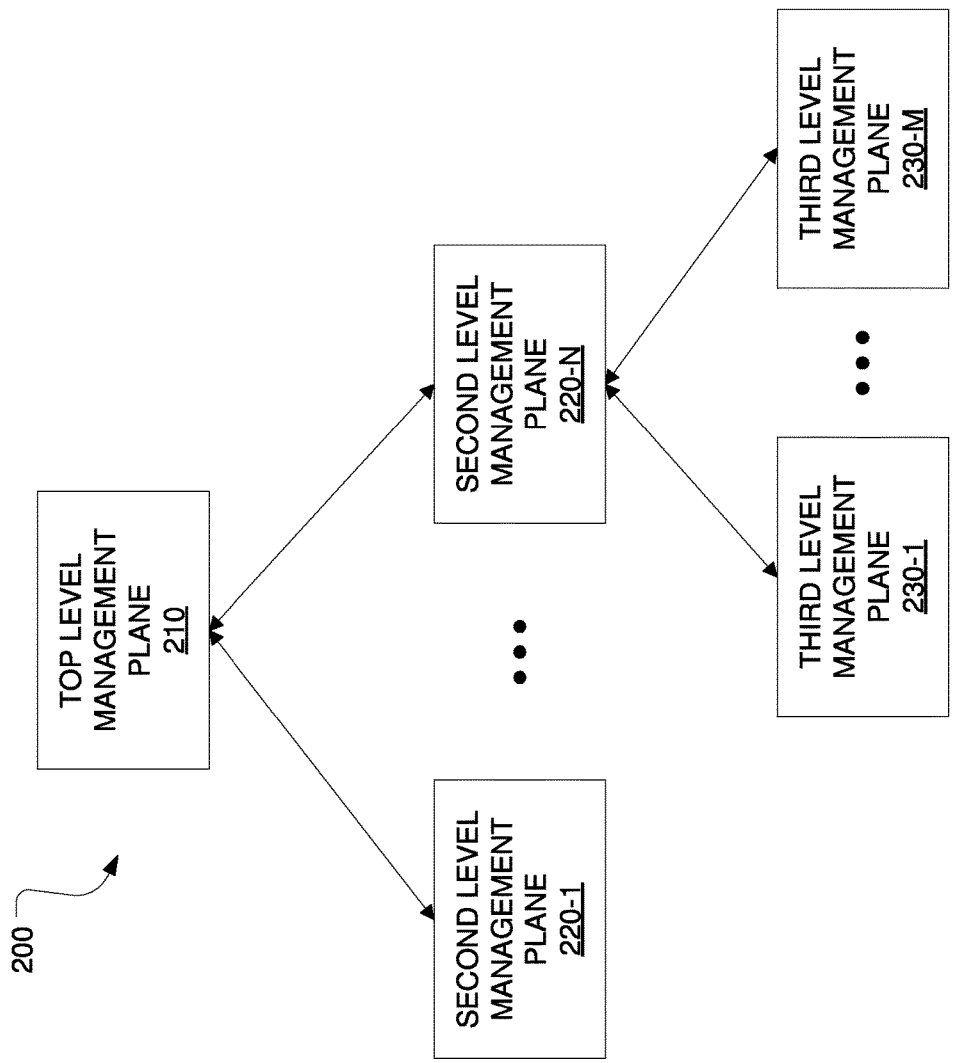
FIG. 2 is a block diagram of one embodiment of a management plane hierarchical architecture.

FIG. 2 is a block diagram of one embodiment of a management plane hierarchical architecture 200. Architecture 200 includes a top level management plane 210 having second and third levels beneath it. Top level management plane 210 coordinates among second level management planes 220-1 through 220-N. Each of second level management planes 220-1 through 220-N is responsible for coordinating among its respective third level management planes. For example, Second level management plane 220-N coordinates among third level management planes 230-1 through 230-M. At each level of architecture 200, the management plane can include up to the full functionality for management plane 130 of FIG. 1. Top level management plane 210 and other upper-level management planes in architecture 200 also include coordination capabilities for coordinating among respective lower-level management planes. The division of the management plane into the various levels of architecture 200 can be done in a variety of ways, including by geographic zones, virtual networks, and service types. In certain embodiments, within a single level of architecture 200, peer management planes can also communicate with each other. For example, second level management plane 220-1 could communicate with second level management plane 220-2.

Figure 3:
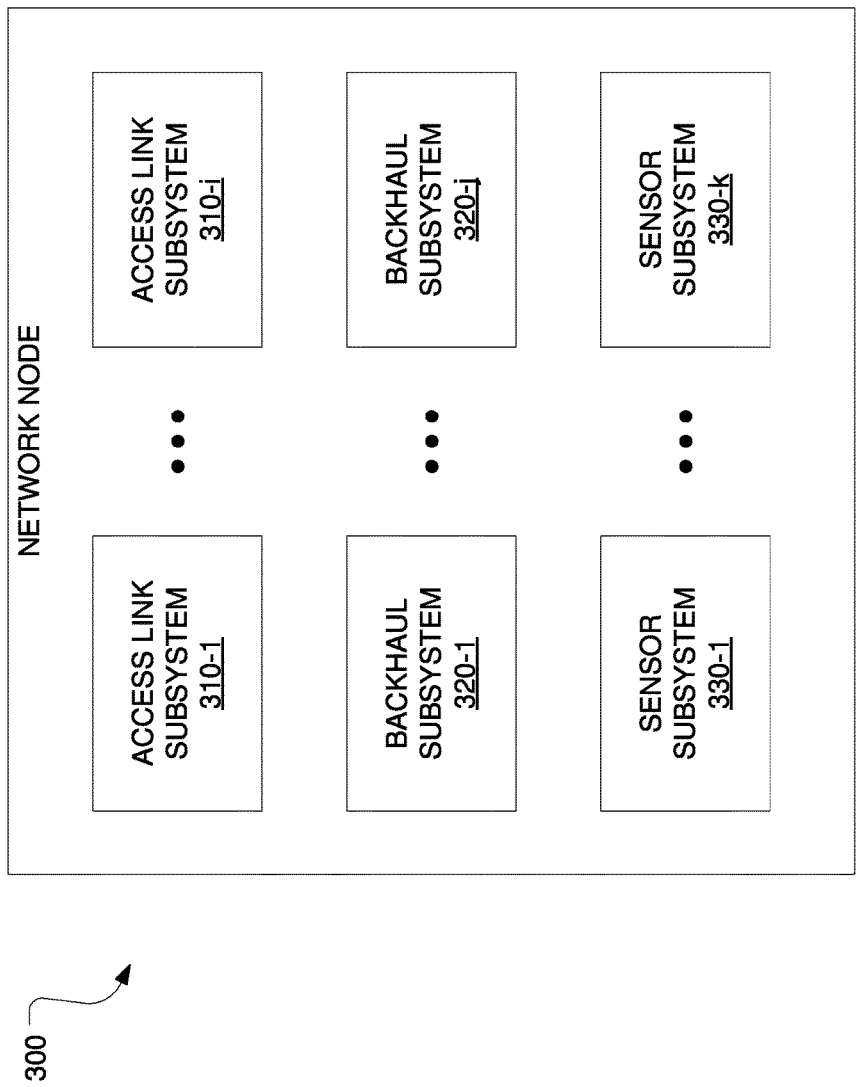
FIG. 3 is a block diagram of one embodiment of a network node.

FIG. 3 is a block diagram of one embodiment of a network node 300. Network node 300 includes access subsystems 310-1 through 310-i, backhaul subsystems 320-1 through 320-j, and sensor subsystems 330-1 through 330-k. Access subsystems 310-1 through 310-i can include single or multiple access links. Similarly, backhaul subsystems 320-1 through 320-j can include single or multiple backhaul links. The various subsystems of network node 300 can be in different states at a given time. Each of the subsystems can be powered on and off independently, and transition among various states independently. Each of access subsystems 310-1 through 310-i can be in an active state, idle state, or inactive state while powered on. Each of backhaul subsystems 320-1 through 320-j can be in an active state or an inactive state while powered on. Each of sensor subsystems 330-1 through 330-k can be in an active state or an inactive state while powered on. Each of these subsystems is inactive while powered off.

The operation of the subsystems of network node 300 varies with each subsystems current state. An access subsystem, while active, carries out continuous downlink (DL) transmissions, discontinuous radio frequency (RF) transmissions (e.g., pilots and reference signals), and continuously receiving and monitoring UL transmissions. In the idle state, the access subsystem carries out no DL RF transmissions, but continuously carries out UL receiving and monitoring. While inactive, the access subsystem shuts down RF activity, including DL and UL.

A backhaul subsystem, in the active state, carries out RF transmissions and continuously receives and monitors RF transmissions. While inactive, the backhaul subsystem shuts down RF activity. Similarly, a sensor subsystem, sometimes referred to as an out-of-band sensor subsystem, carries out continuous and discontinuous RF transmissions and continuously receives and monitors RF transmissions while active. While inactive, the sensor subsystem shuts down RF activity.

Figure 4:
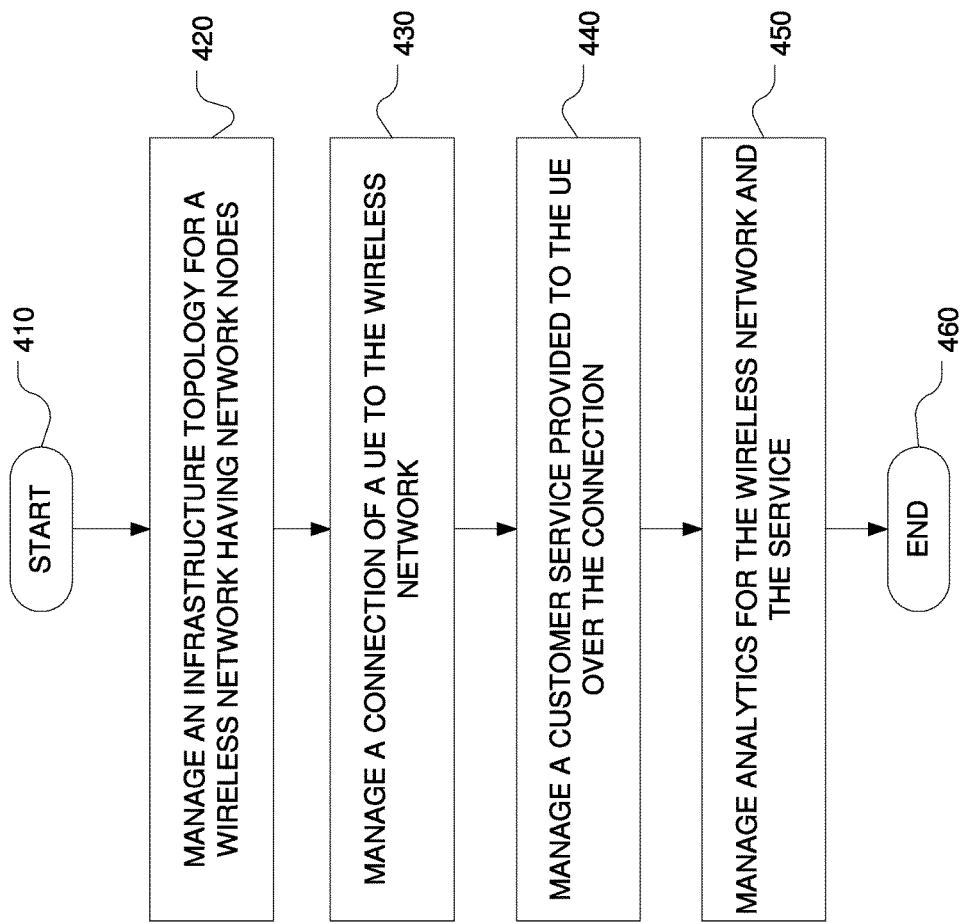
FIG. 4 is a flow diagram of one embodiment of a method of managing a wireless network.

FIG. 4 is a flow diagram of one embodiment of a method of managing a wireless network. The method begins at a start step 410. At an infrastructure management step 420, a management plane manages an infrastructure topology for the wireless network. The wireless network's infrastructure topology generally includes a plurality of network nodes. At a connectivity management step 430, the management plane manages connections of UEs to the wireless network according to the infrastructure topology. At a customer service management step 440, the management plane manages services provided to the UEs over their respective connections. At a data analytics step 450, the management plane performs analysis on performance metrics and manages the corresponding analytics. These steps are generally carried out in parallel, however, under certain circumstances, there are sequential aspects among the steps. The method then ends at an end step 460.

Figure 5:
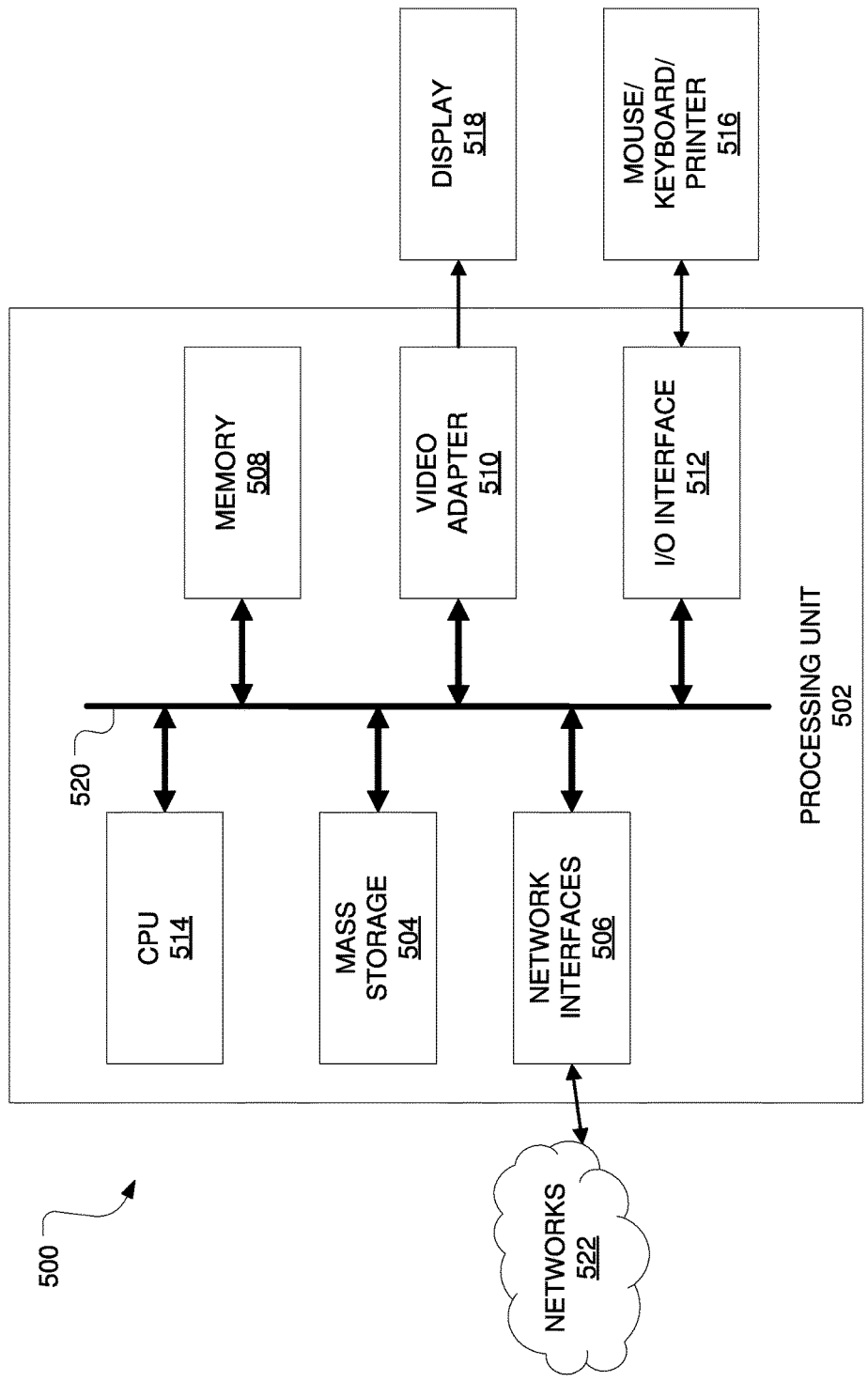
FIG. 5 is a block diagram of one embodiment of a computing system.

FIG. 5 is a block diagram of a computing system 500 that may be used for implementing the devices and methods disclosed herein. Specific devices may utilize all of the components shown or only a subset of the components, and levels of integration may vary from device to device. Furthermore, a device may contain multiple instances of a component, such as multiple processing units, processors, memories, transmitters, receivers, etc. The computing system 500 may comprise a processing unit 502 equipped with one or more input/output devices, such as a speaker, microphone, mouse, touchscreen, keypad, keyboard, printer, display, and the like. The processing unit may include a central processing unit (CPU) 514, memory 508, a mass storage device 504, a video adapter 510, and an I/O interface 512 connected to a bus 520.

The bus 520 may be one or more of any type of several bus architectures including a memory bus or memory controller, a peripheral bus, video bus, or the like. The CPU 514 may comprise any type of electronic data processor. The memory 508 may comprise any type of non-transitory system memory such as static random access memory (SRAM), dynamic random access memory (DRAM), synchronous DRAM (SDRAM), read-only memory (ROM), a combination thereof, or the like. In an embodiment, the memory 508 may include ROM for use at boot-up, and DRAM for program and data storage for use while executing programs.

The mass storage 504 may comprise any type of non-transitory storage device configured to store data, programs, and other information and to make the data, programs, and other information accessible via the bus 520. The mass storage 504 may comprise, for example, one or more of a solid state drive, hard disk drive, a magnetic disk drive, an optical disk drive, or the like.

The video adapter 510 and the I/O interface 512 provide interfaces to couple external input and output devices to the processing unit 502. As illustrated, examples of input and output devices include a display 518 coupled to the video adapter 510 and a mouse/keyboard/printer 516 coupled to the I/O interface 512. Other devices may be coupled to the processing unit 502, and additional or fewer interface cards may be utilized. For example, a serial interface such as Universal Serial Bus (USB) (not shown) may be used to provide an interface for a printer.

The processing unit 502 also includes one or more network interfaces 506, which may comprise wired links, such as an Ethernet cable or the like, and/or wireless links to access nodes or different networks. The network interfaces 506 allow the processing unit 502 to communicate with remote units via the networks. For example, the network interfaces 506 may provide wireless communication via one or more transmitters/transmit antennas and one or more receivers/receive antennas. In an embodiment, the processing unit 502 is coupled to a local-area network 522 or a wide-area network for data processing and communications with remote devices, such as other processing units, the Internet, remote storage facilities, or the like.

Figure 6:
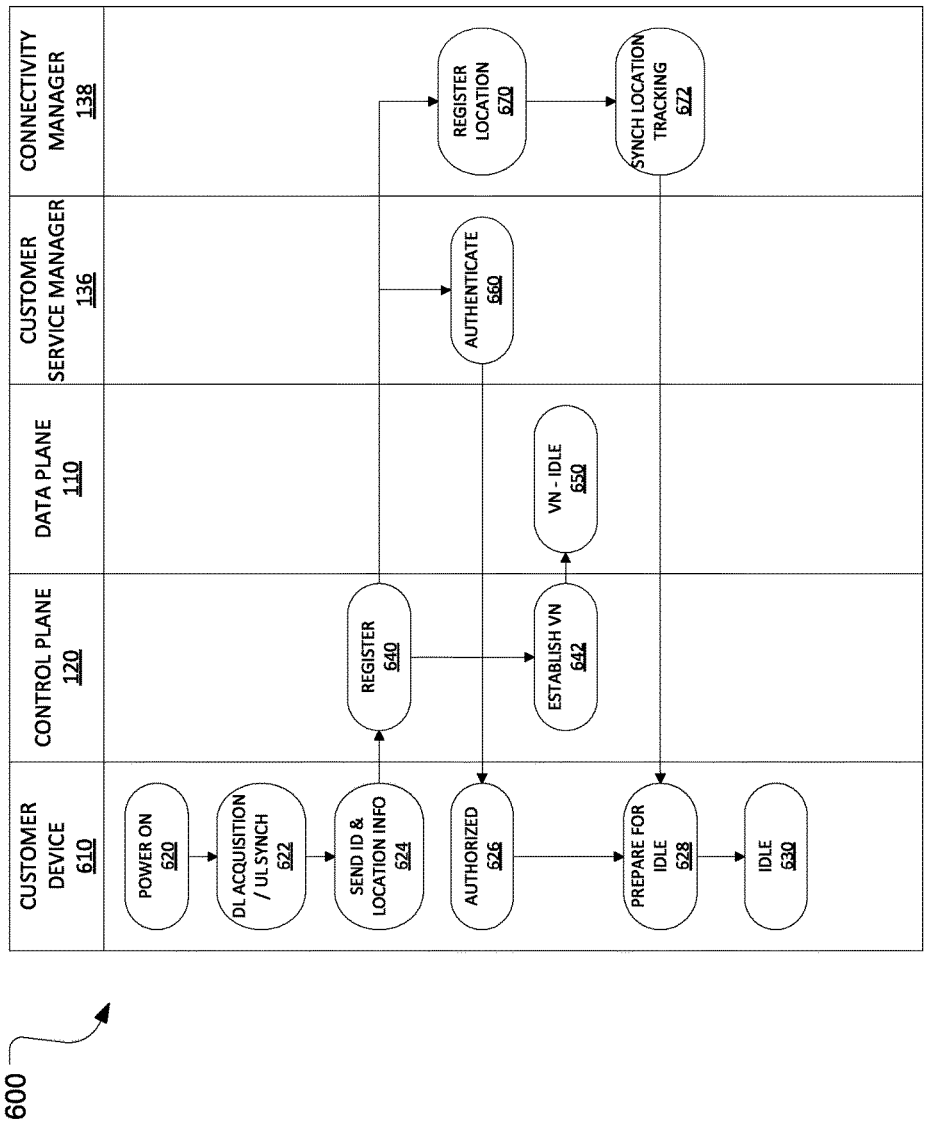
FIG. 6 is an illustration of operation of an embodiment management plane when a customer device enters the network.

FIG. 6 is an illustration of a procedure 600 representing operation of an embodiment management plane when a customer device enters the network. Procedure 600 is carried out among various components of the management plane, including customer service manager 136 and connectivity manager 138, both of FIG. 1. Procedure 600 is also carried out among a customer device 610, control plane 120 of FIG. 1, and data plane 110, also of FIG. 1. Customer device 610 powers on at step 620 and begins DL acquisition and UL synchronization procedures at step 622. Customer device 610 then sends ID and location information, at step 624 to control plane 120 for registration at step 640. The location information is passed from control plane 120 to connectivity manager 138 where it is registered at step 670. Connectivity manager 138 stores the location information in the customer device information database. Connectivity manager 138 then begins synchronizing location tracking with customer device 610 at step 672. The ID information is passed to customer service manager 136 for authentication at step 660. Authentication is carried out according to the ID information and information in the customer service information database. Authorization is then sent from customer service manager 136 to customer device 610, which is received at step 626. Control plane 120 establishes a VN at step 642, which is represented by VN-idle in data plane no at step 650. Customer device 610 then prepares for idle at step 628, and enters the idle state at step 630.

Figure 7:
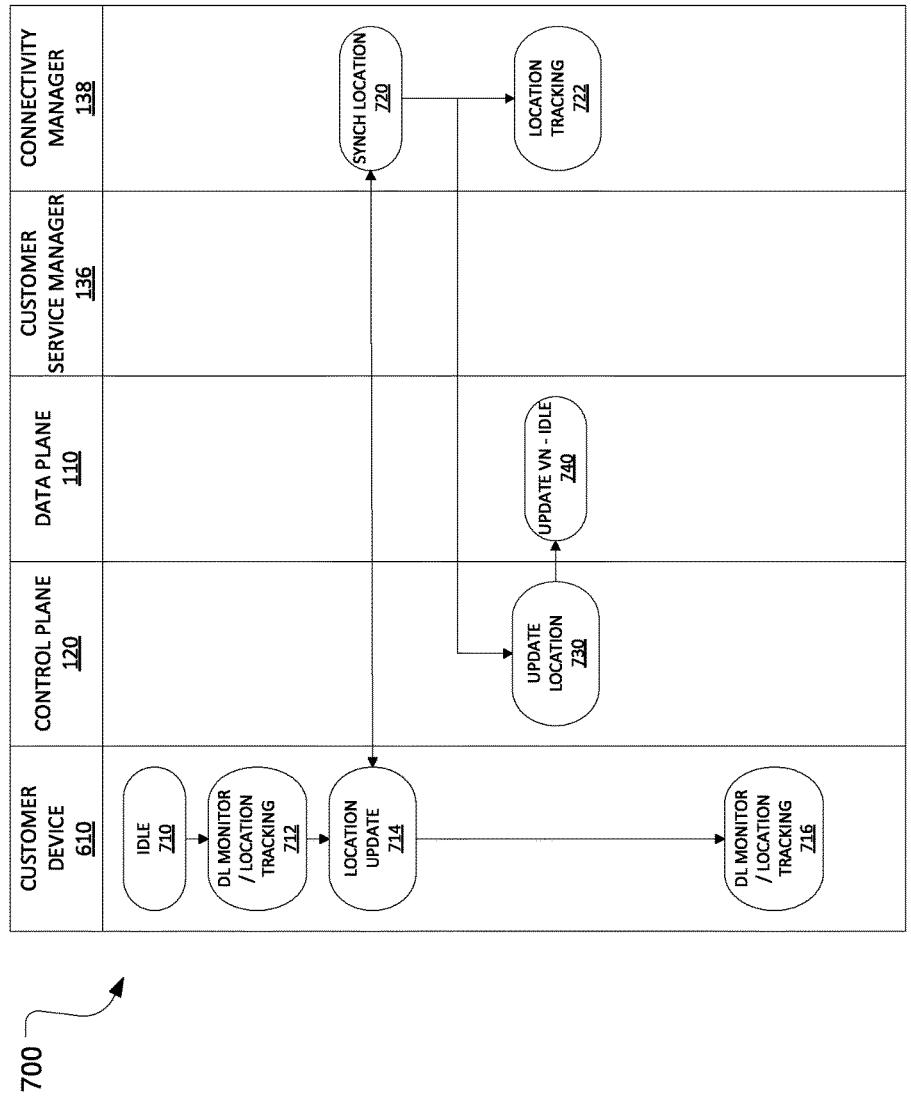
FIG. 7 is an illustration of operation of an embodiment management plane when a customer device is idle without burst traffic.

FIG. 7 is an illustration of a procedure 700 representing operation of an embodiment management plane when a customer device is idle without burst traffic. Procedure 700 begins with customer device 610 in an idle state at step 710. Customer device performs DL monitoring and location tracking at step 712. At step 714, a location update is made and is synchronized with connectivity manager 138 at step 720. Connectivity manager 138 updates the location in customer device information database. Connectivity manager then sends a location update to control plane 120 at step 730. Control plane 120 then updates the VN-idle at step 740. Connectivity manager 138 proceeds with location tracking at 722 and customer device 610 resumes DL monitoring and location tracking at step 716.

Figure 8:
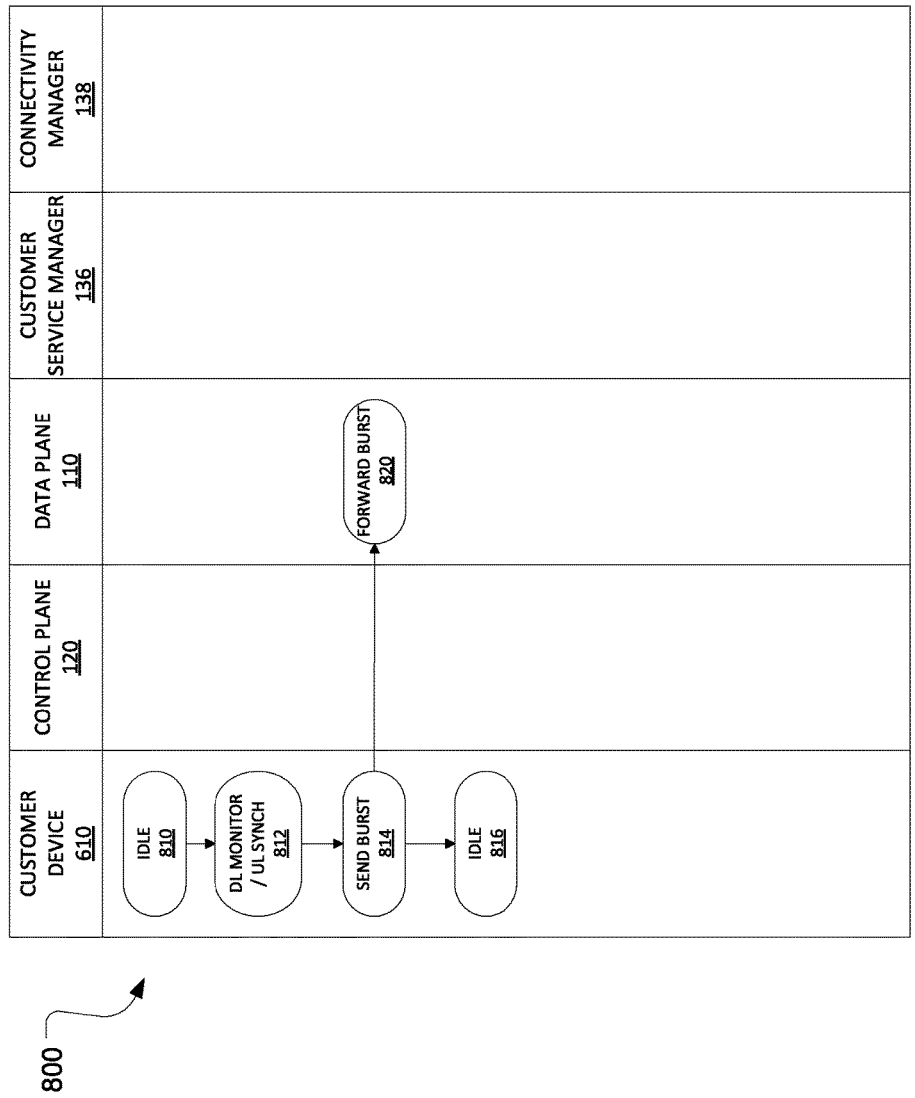
FIG. 8 is an illustration of operation of an embodiment management plane when a customer device is idle with upstream burst traffic.

FIG. 8 is an illustration of a procedure 800 representing operation of an embodiment management plane when a customer device is idle with upstream burst traffic. Procedure 800 begins with customer device 610 in an idle state at step 810. Customer device 610 performs DL monitoring and UL synchronization at step 812. At step 814, customer device 610 sends a traffic burst to data plane 110. Data plane 110 forwards the traffic burst to a v-u-SGW using VN—idle. Customer device 610 remains in idle at step 816.

Figure 9:
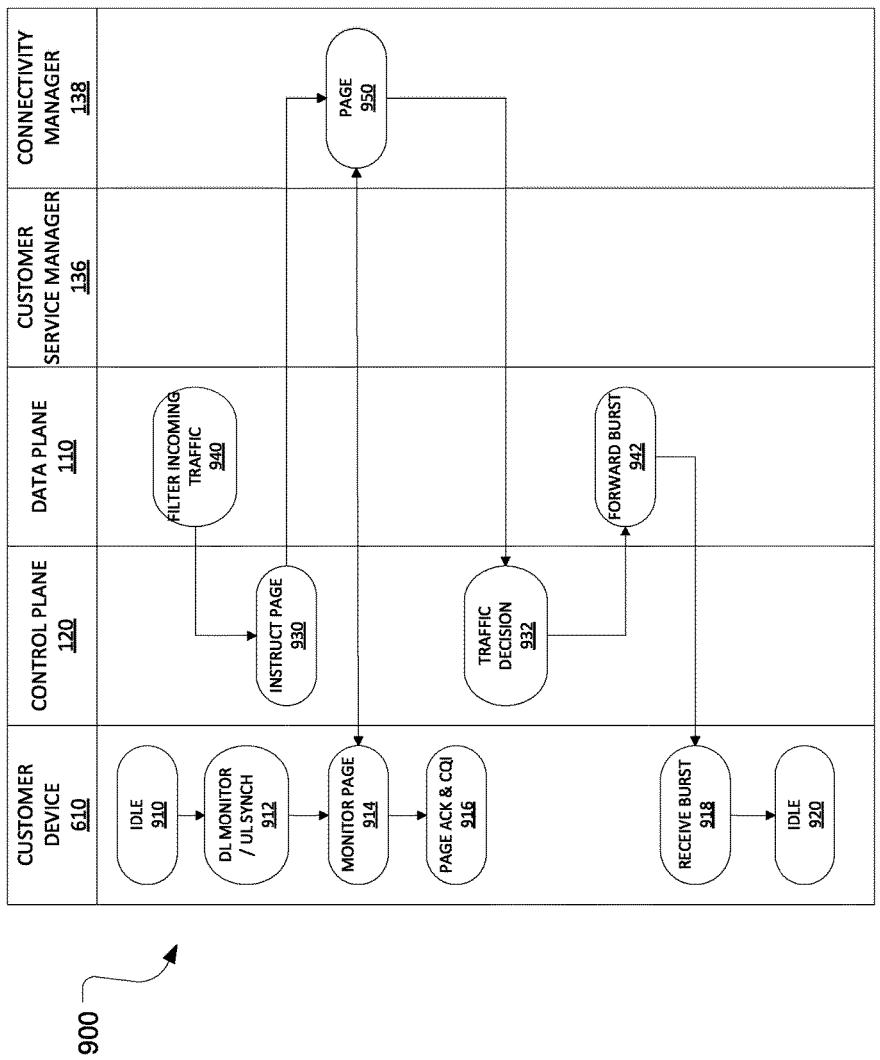
FIG. 9 is an illustration of operation of an embodiment management plane when a customer device is idle with downstream burst traffic.

FIG. 9 is an illustration of a procedure 900 representing operation of an embodiment management plane when a customer device is idle with downstream burst traffic. Procedure 900 begins with customer device 610 in an idle state at step 910. Customer device 610 performs DL monitoring and UL synchronization at step 912, and monitors for paging at step 914. Data plane no receives burst traffic at a v-u-SGW and filters it at step 940. The v-u-SGW notifies control plane 120. Control plane 120 instructs connectivity manager 138 to page customer device 610 at step 950. Customer device 610 acknowledges the page and measures CQI at step 916. According to the page, control plane 120 makes a traffic decision at step 932 and instructs data plane no to forward the burst at step 942. The burst is received by customer device 610 at step 918, and customer device 610 continues to idle at step 920.

Figure 10:
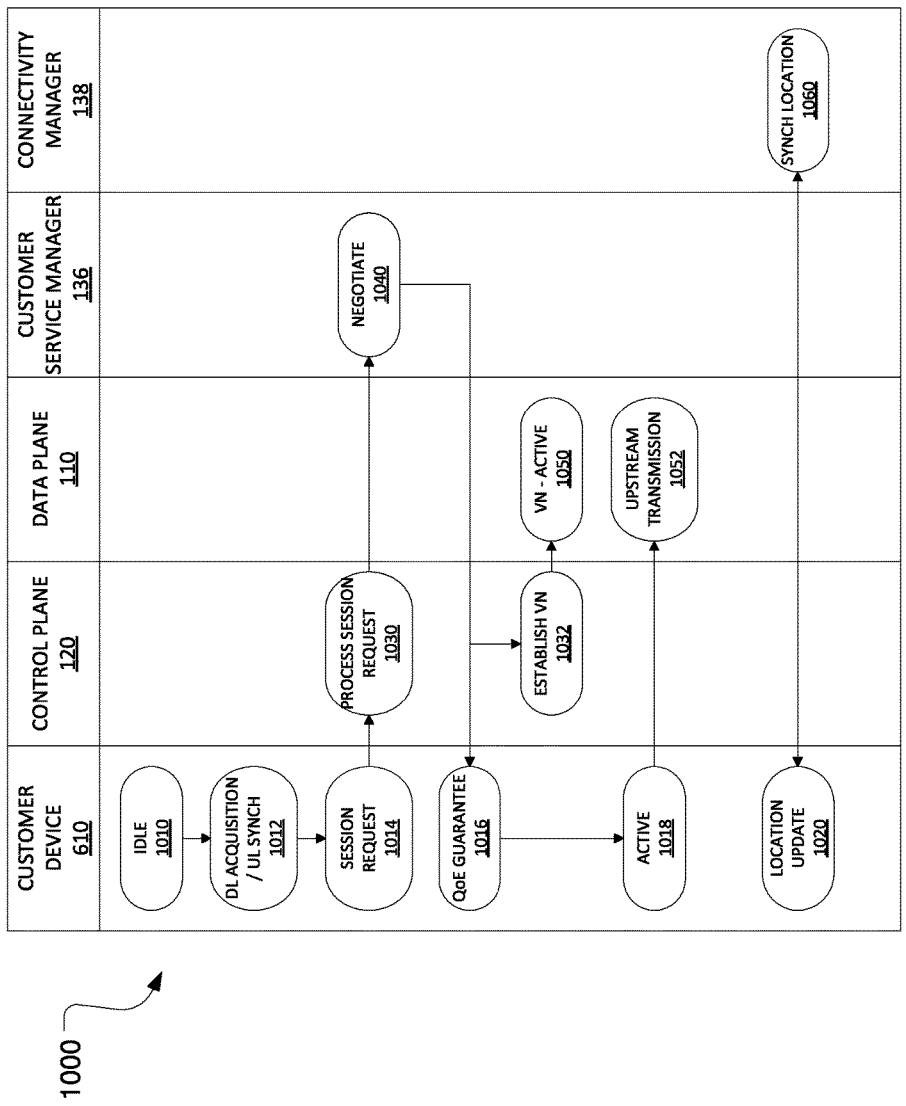
FIG. 10 is an illustration of operation of an embodiment management plane when an upstream session triggers a customer device to transition from idle to active.

FIG. 10 is an illustration of a procedure 1000 representing operation of an embodiment management plane when an upstream session triggers a customer device to transition from idle to active. Procedure 1000 begins with customer device 610 in an idle state at step 1010. Customer device 610 performs DL acquisition and UL synchronization at step 1012. Customer device 610 submits a session request to control plane 120 at step 1014. Control plane 120 processes the request at step 1030 and begins negotiation with customer service manager 136 at step 1040. Customer service manager 136 and control plane 120 negotiate a QoE for customer device 610 according to information in the customer service information database and make a QoE guarantee at step 1016. In an alternative embodiment, customer service manager 136 negotiates directly with customer device 610 to establish the QoE guarantee. Control plane 120 establishes a VN at step 1032 according to the negotiated QoE, location information, and network status. VN-active 1050 is created in in data plane no at step 1050. Customer device 610 then transitions to an active state at step 1018 and makes an upstream transmission via data plane no at step 1052. While customer device 610 is in the active state, customer device 610 makes occasional location updates at step 1020 and connectivity manager 138 synchronizes location at step 1060 and updates the location in the customer device information database.

Figure 11:
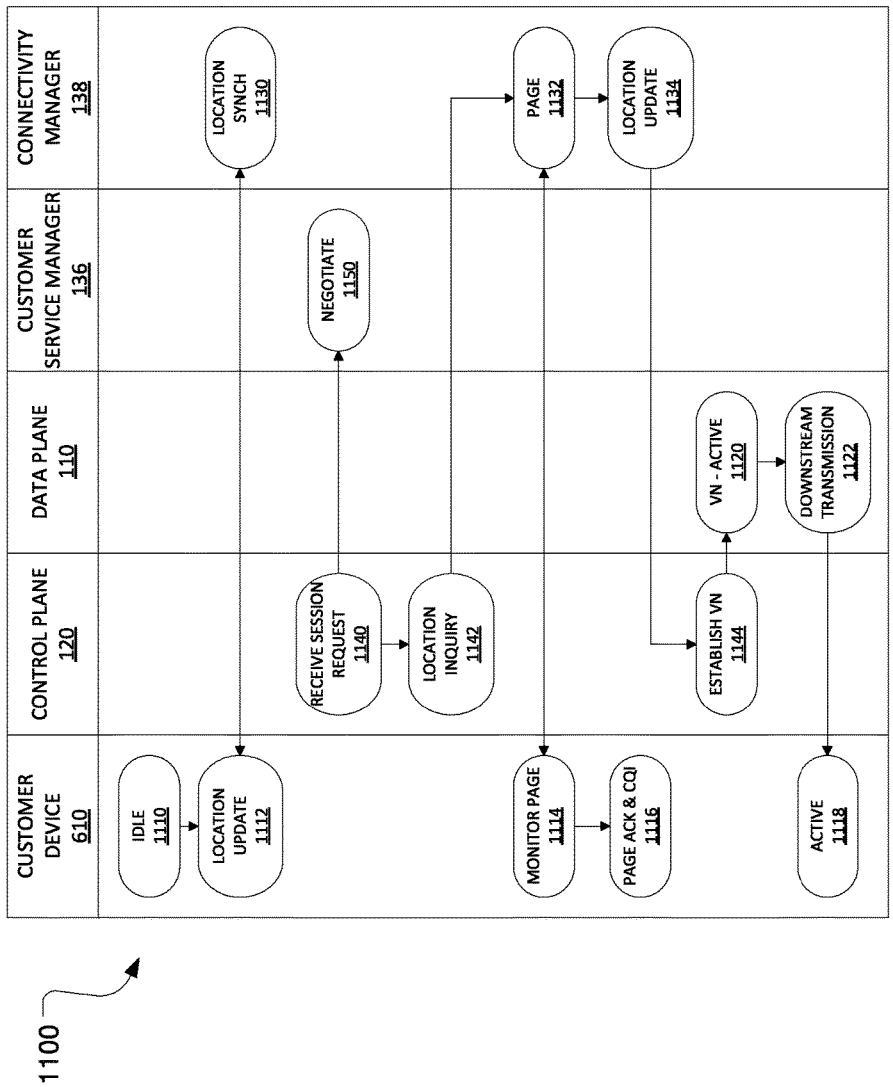
FIG. 11 is an illustration of operation of an embodiment management plane when a downstream session triggers a customer device to transition from idle to active.

FIG. 11 is an illustration of a procedure 1100 representing operation of an embodiment management plane when a downstream session triggers a customer device to transition from idle to active. Procedure 1100 begins with customer device 610 in an idle state at step 1110. Customer device 610 makes a location update at step 1112 and connectivity manager 138 synchronizes location at step 1130. Connectivity manager 138 updates the location in the customer device information database. Customer device 610 continuously monitors for paging at step 1114. A session request is received at control plane 120 at step 1140. Control plane 120 and customer service manager 136 then negotiate QoE requirements at step 1150 according to information in the customer service information database. Control plane 120 makes a location inquiry to connectivity manager 138 at step 1142. Connectivity manager 138 then pages customer device 610 at step 1132. Customer device 610 acknowledges the page and measures CQI at step 1116. Connectivity manager 138 updates the location for customer device 610 and passes it to control plane 120. Control plane 120 establishes a VN at step 1144 according to the location information, QoE requirements, and network status. A VN-active is created in data plane 110 at step 1120. A downstream transmission is then made at step 1122, triggering customer device 610 to transition to an active state at step 1118.

Figure 12:
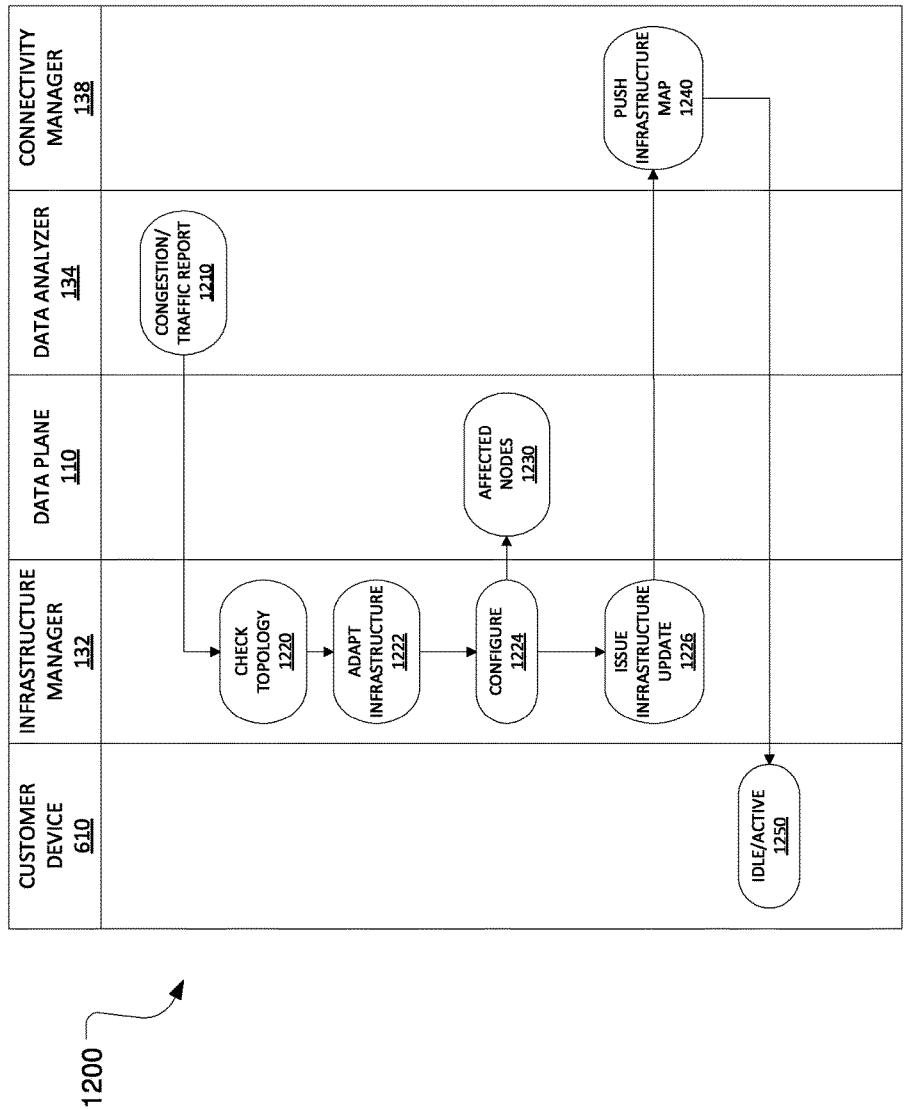
FIG. 12 is an illustration of operation of an embodiment management plane for adapting a topology.

FIG. 12 is an illustration of a procedure 1200 representing operation of an embodiment management plane for adapting a topology. Procedure 1200 is carried out over various elements of the management plane, including infrastructure manager 132, data analyzer 134, and connectivity manager 138, all of FIG. 1. Procedure 1200 is also partially carried out by customer device 610 and data plane 110 of FIG. 1. Data analyzer 134 generates a congestion and traffic report at step 1210 and delivers the report to infrastructure manager 132. Infrastructure manager 132 checks the current network topology at step 1220. Infrastructure manager 132 then adapts the topology at step 1222 according to the congestion and traffic report and information in the infrastructure database. Adaptations can include bandwidth increase, new backhaul links, and modifying existing backhaul links, among other adaptations. At step 1224, infrastructure manager 132 configures network nodes 1230 affected by the adaptation. Configuration can include beam/sector configuration and access link configuration, among other parameters. Infrastructure manager 132 then issues an infrastructure update at step 1226. Connectivity manager 138 receives the infrastructure update at pushes an updated infrastructure map to customer device 610 at step 1240. Customer device 610 can be in an idle or active state.

Figure 13:
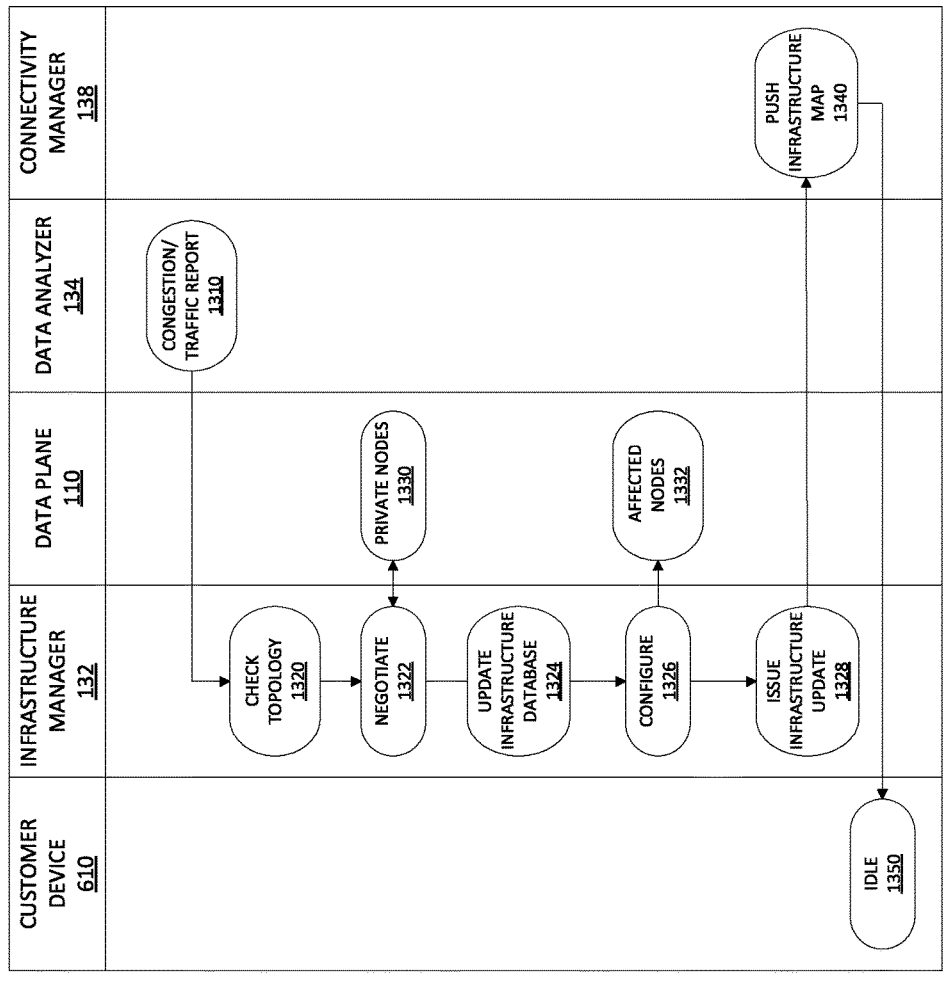
FIG. 13 is an illustration of operation of an embodiment management plane for integrating private network nodes into the network.

FIG. 13 is an illustration of a procedure 1300 representing operation of an embodiment management plane for integrating private network nodes into the network. Procedure 1300 begins with a congestion and traffic report from data analyzer 134 at step 1310. The report is received by infrastructure manager 132. Infrastructure manager checks the current network topology at step 1320. According to the congestion and traffic report, infrastructure manager 132 negotiates with private nodes 1330 to integrate them into the data plane 110 at step 1322. The infrastructure database is updated at 1324 and affected nodes 1332 are updated at step 1326. Infrastructure manager 132 issues an infrastructure update at step 1328. Connectivity manager 138 receives the infrastructure update and pushes an updated infrastructure map to customer device 610 at step 1340. Customer device 610 is in an idle state at step 1350.

Figure 14:
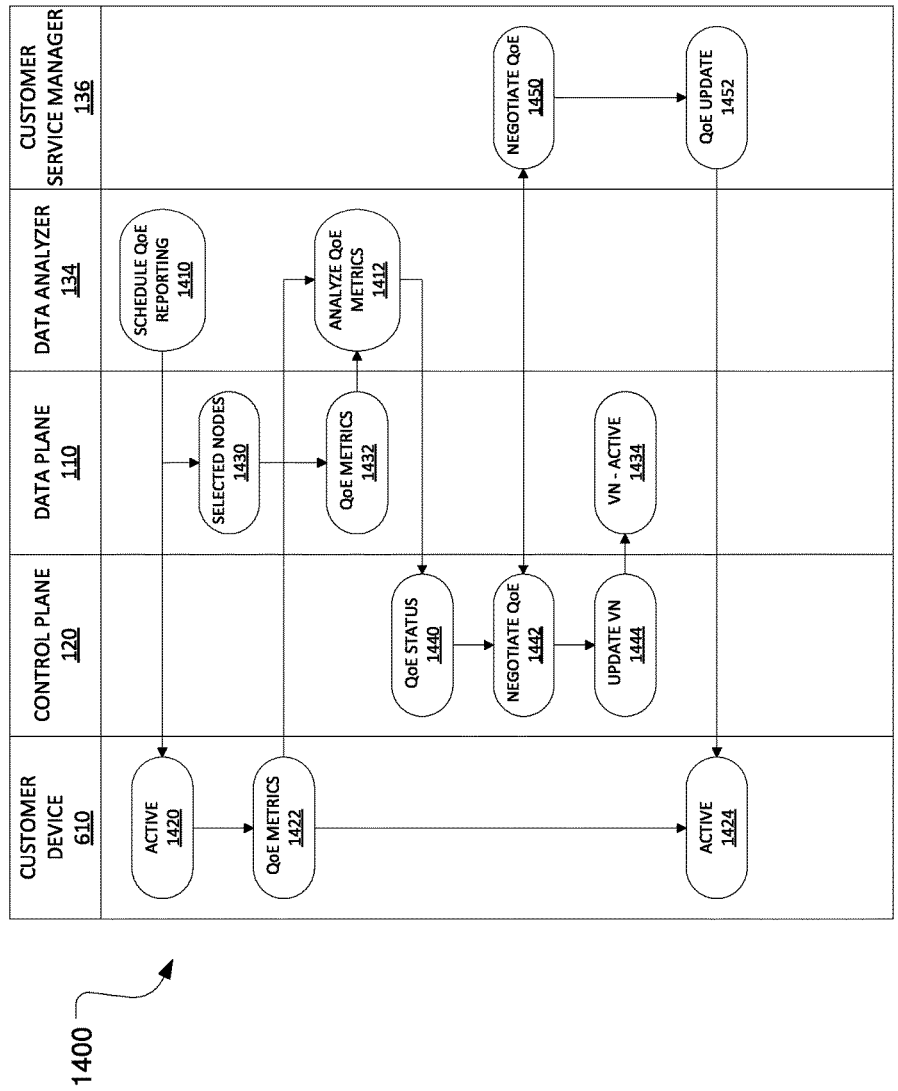
FIG. 14 is an illustration of operation of an embodiment management plane for on-demand QoE assurance.

FIG. 14 is an illustration of a procedure 1400 representing operation of an embodiment management plane for on-demand QoE assurance. Procedure 1400 is carried out among customer device 610, control plane 120, data plane 110, data analyzer 134, and customer service manager 136. Procedure 1400 begins with customer device 610 in an active state at step 1420. Data analyzer 134 schedules QoE reporting at step 1410. QoE reporting can be scheduled with active customer devices, selected network nodes 1430, or both. Customer device 610 generates QoE metrics at step 1422 and sends them to data analyzer 134. Selected nodes 1430 in data plane no generate QoE metrics at step 1432 and send those to data analyzer 134 as well. At step 1412, data analyzer analyzes the QoE metrics from customer device 610 and data plane no to generate a QoE status. The QoE status is sent to control plane 120 at step 1440. Control plane 120 negotiates QoE at step 1442 with customer service manager 136 at step 1450. The negotiation is done according to the QoE status generated by data analyzer 134. According to the QoE negotiation, control plane 120 updates VN-active 1434 step 1444. Customer service manager 136 updates QoE requirements at step 1452 according to the negotiated QoE and sends the update to customer device 610. Customer device 610 continues in the active state at step 1424.

Figure 15:
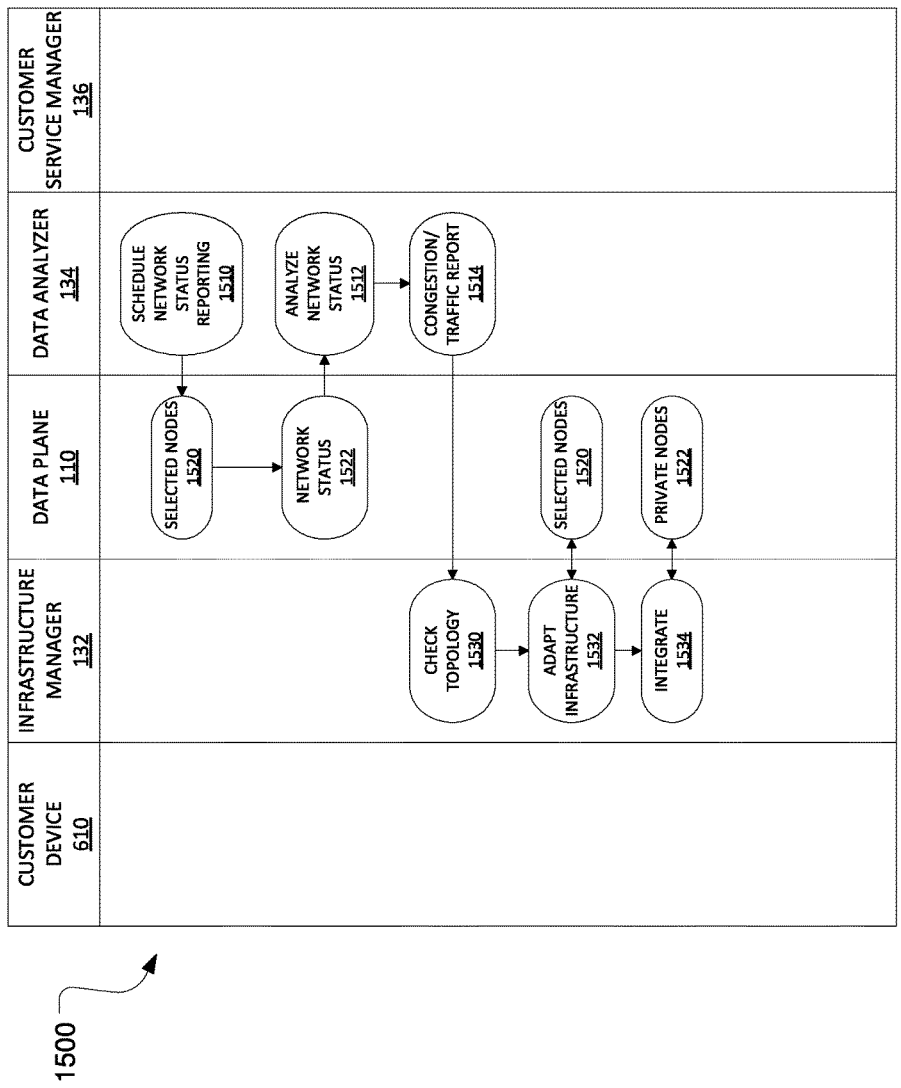
FIG. 15 is an illustration of operation of an embodiment management plane for on-demand network status analysis.

FIG. 15 is an illustration of a procedure 1500 representing operation of an embodiment management plane for on-demand network status analysis. Procedure 1500 is carried out among infrastructure manager 132, data plane no, and data analyzer 134. Procedure 1500 begins with data analyzer 134 scheduling network status reporting at step 1510. Network status reporting is scheduled for selected nodes 1520. Selected nodes 1520 in data plane no generate network status reports at step 1522. The network status reports are sent to data analyzer 134. Data analyzer 134 analyzes the network statuses at step 1512 and generates a congestion and traffic report at step 1514. The congestion and traffic report is passed to infrastructure manager 132. Infrastructure manager 132 checks the current network topology at step 1530. Infrastructure manager 132 then adapts the infrastructure at step 1532 for selected nodes 1520 according to the congestion and traffic report. Infrastructure manager 132 can also integrate private nodes 1522 into the wireless network at step 1534 according to the congestion and traffic report.

An embodiment method of managing a wireless network includes managing an infrastructure topology for the wireless network, wherein the wireless network includes network nodes, managing a connection of a user equipment (UE) to the wireless network, managing a customer service provided to the UE over the connection, and managing analytics for the wireless network and the service.

In a further embodiment of the method, the managing the infrastructure topology includes adapting the infrastructure topology according to congestion and traffic load distribution on the wireless network and communicating the infrastructure topology to the network nodes and UEs attached to the wireless network.

In a further embodiment of the method, the adapting the infrastructure topology includes identifying the congestion and traffic load distribution on the wireless network, checking the infrastructure topology, carrying out at least one of increasing bandwidth, establishing a new backhaul link, and changing an existing backhaul link, updating an infrastructure database according to the carrying out, configuring the network nodes affected by the carrying out, and communicating an updated infrastructure topology to a connectivity manager configured to carry out the managing the connection according to the updated infrastructure topology.

In a further embodiment of the method, the managing the connection includes updating an access map according to the updated infrastructure topology and transmitting the access map to the UE.

In a further embodiment of the method, the managing the infrastructure topology includes integrating a plurality of private network nodes into the wireless network, wherein the wireless network includes current network nodes.

In a further embodiment of the method, the integrating includes identifying congestion and traffic load distribution on the wireless network, checking the infrastructure topology, negotiating with the plurality of private network nodes to generate an extension of the wireless network, updating an infrastructure database according to the extension, configuring the plurality of private network nodes and affected nodes among the current network nodes, and communicating an updated infrastructure topology to a connectivity manager configured to carry out the managing the connection according to the updated infrastructure topology.

In a further embodiment of the method, the managing analytics includes scheduling quality of experience (QoE) reporting from at least one UE attached to the wireless network and the network nodes, receiving QoE performance reports from the at least one UE, generating a QoE status according to the QoE performance reports, and communicating the QoE status to a control plane.

In a further embodiment of the method, the managing analytics includes scheduling network status reporting from the network nodes, receiving network status reports from the network nodes, generating a congestion and traffic report for the wireless network, and communicating the congestion and traffic report to an infrastructure manager configured to carry out the managing the infrastructure topology according to the congestion and traffic report.

In a further embodiment of the method, the managing analytics includes providing data analytics as a service (DAaaS).

In a further embodiment of the method, the managing the customer service includes managing private information for a customer corresponding to the UE.

In a further embodiment of the method, the managing the customer service includes authorizing access for the UE to the wireless network.

In a further embodiment of the method, the managing the customer service includes negotiating a quality of experience (QoE) for the service with a control plane according to customer service information, a location of the UE, and a request from the UE for a session, wherein the control plane establishes a virtual network-active (VN-active) for the session.

In a further embodiment of the method, the managing the customer service includes negotiating a quality of experience (QoE) for the service with a control plane according to customer service information, a location of the UE, and a session request from the control plane, wherein the control plane establishes a virtual network-active (VN-active) for the session request over which a downstream transmission is made.

In a further embodiment of the method, the managing the connection includes providing location tracking as a service (LTaaS) to the UE.

In a further embodiment of the method, the managing the connection includes location tracking and registering a location for the UE in a customer device information data structure after the UE enters the wireless network.

In a further embodiment of the method, the managing the connection further includes providing the location to a control plane for updating the virtual network when the UE is in idle the state.

In a further embodiment of the method, the managing the connection includes maintaining the UE's current state and paging the UE when the UE is in an idle state.

An embodiment computing system for managing a wireless network, includes a customer service manager configured to authorize access to the wireless network by user equipments (UEs) according to respective customer service information, and negotiate a respective quality of experience (QoE) for each of the UEs according to respective locations of the UEs, the respective customer service information, and respective session requests for which respective virtual networks (VNs) are established by a control plane. The embodiment computing system also includes a connectivity manager configured to track respective locations of the UEs and update the respective VNs to which the UEs are connected, and a data analyzer configured to generate a congestion and traffic report according to network status reports received periodically from network nodes attached to the wireless network, and generate a QoE status according to QoE reports received periodically from the UEs. The embodiment computing system also includes an infrastructure manager configured to adapt a topology for the wireless network according to the topology and the congestion and traffic report.

In a further embodiment of the computing system, the infrastructure manager is further configured to integrate a plurality of private network nodes into the wireless network according to the topology and the congestion and traffic report.

In a further embodiment of the computing system, the connectivity manager is further configured to page idle UEs among the UEs.

In a further embodiment of the computing system, the connectivity manager is further configured to track the respective locations of the UEs using the respective VNs.

In a further embodiment of the computing system, the customer service manager is further configured to negotiate the respective QoE for one UE among the UEs according to a upstream session request generated by the one UE, wherein the respective QoE for the one UE is negotiated with the control plane.

In a further embodiment of the computing system, the customer service manager is further configured to negotiate the respective QoE for one UE among the UEs according to a downstream session request received from the control plane.

In a further embodiment of the computing system, the connectivity manager is further configured to update an access map according to the topology updated by the infrastructure manager and transmit the access map to the UEs.

An embodiment communication system includes a control plane configured to make network resource management decisions for customer service traffic over a wireless network, a data plane including network nodes arranged in a topology and configured to forward network traffic according to the traffic management decisions, and a management plane having a customer service manager configured to authorize access to the wireless network by UEs according to respective customer service information, and negotiate a respective quality of experience (QoE) for each of the UEs according to respective locations of the UEs, the respective customer service information, and respective session requests for which respective virtual networks (VNs) are established by the control plane. The management plan also includes a connectivity manager configured to track respective locations of the UEs and update the respective VNs to which the UEs are connected, and a data analyzer configured to generate a congestion and traffic report according to network status reports received periodically from the network nodes, and generate a QoE status according to QoE reports received periodically from the UEs. The management plane also includes an infrastructure manager configured to adapt the topology according to the topology and the congestion and traffic report.

In a further embodiment of the communication system, the management plane includes a central managing server configured to coordinate the customer service manager, the connectivity manager, the data analyzer, and the infrastructure manager for a plurality of distributed managing servers.

In a further embodiment of the communication system, the plurality of distributed managing servers are distributed according to geography.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for a customer device connecting to a wireless network, comprising:
    sending, by the customer device to a connectivity manager via a control plane, location information for synchronizing location tracking between the customer device and the connectivity manager;
    sending, by the customer device to a customer service manager via the control plane, ID information for authorization between the customer device and the customer service manager;
    entering, by the customer device, an idle state after receiving an authorization success; and
    after entering the idle state, submitting, by the customer device, an upstream session request to the control plane, receiving, by the customer device, a quality of experience (QoE) guarantee from the customer service manager, transitioning, by the customer device, to an active state, and sending, by the customer device, an upstream transmission to a data plane in accordance with the QoE guarantee.

2. The method of claim 1, further comprising negotiating, by the customer device, with the customer service manager to establish the QoE guarantee.

3. A method for a customer device connecting to a wireless network, comprising:
    sending, by the customer device while remaining in an idle state, an upstream burst to a network device, wherein a data plane comprising the network device forwards the upstream burst to a user-specific virtual serving gateway (v-u-SGW); and
    receiving, by the customer device while remaining in the idle state, a downstream burst from the network device.

4. The method of claim 3, further comprising:
    transmitting, by the customer device, identification information and location information to the network device to register the customer device.

5. The method of claim 4, wherein registering the customer device further comprises authenticating the customer device with the transmitted identification information.

6. The method of claim 5, wherein the customer device enters the idle state after authenticating the customer device.

7. The method of claim 3, wherein remaining in the idle state comprises transmitting or receiving without the customer device transitioning to an active state.

8. The method of claim 3, further comprising:
    performing, by the customer device, downlink monitoring and location tracking; and
    performing, by the customer device, a location update and synchronization with the network device.

9. The method of claim 3, further comprising:
    receiving, by the customer device, a paging message; and
    measuring a channel quality indicator.

10. The method of claim 3, further comprising:
    transitioning, by the customer device, from the idle state to an active state in response to initiating an upstream transmission.

11. The method of claim 3, further comprising:
    transitioning, by the customer device, from the idle state to an active state in response to
    receiving a downstream transmission.

12. The method of claim 3, further comprising:
receiving, by the customer device, an updated infrastructure map.

13. The method of claim 12, wherein the updated infrastructure map comprises adaptations based on a congestion and traffic report.

14. The method of claim 3, wherein the upstream burst is an upstream data burst without any control signaling information in the upstream burst.

15. The method of claim 3, wherein the data plane forwards the upstream burst to the v-u-SGW using an idle virtual network (VN), the idle VN corresponding to the customer device in the idle state.

16. The method claim 3, wherein the customer device has an idle state ID associated with the customer device in the idle state.

17. A customer device comprising:
a receiver;
a transmitter; and
a processor operatively coupled to the receiver and the transmitter, and configured to:
send, while remaining in an idle state, an upstream burst to a network device, wherein a data plane comprising the network device forwards the upstream burst to a user-specific virtual serving gateway (v-u-SGW); and
receive, while remaining in the idle state, a downstream burst from the network device.

18. The customer device of claim 17, wherein the processor is further configured to transmit identification information and location information to the network device to register the customer device.

19. The customer device of claim 18, wherein the processor is further configured to authenticate the customer device with the transmitted identification information when registering the customer device.

20. The customer device of claim 19, wherein the processor is further configured to cause the customer device to enter the idle state after authenticating the customer device.

21. The customer device of claim 17, wherein remaining in the idle state comprises transmitting or receiving without the customer device transitioning to an active state.

22. The customer device of claim 17, wherein the processor is further configured to:
perform downlink monitoring and location tracking; and
perform a location update and synchronization with the network device.

23. The customer device of claim 17, wherein the processor is further configured to:
receive a paging message; and
measure a channel quality indicator.

24. The customer device of claim 17, wherein the processor is further configured to transition from the idle state to an active state in response to initiating an upstream transmission.

25. The customer device of claim 17, wherein the processor is further configured to transition from the idle state to an active state in response to receiving a downstream transmission.

26. The customer device of claim 17, wherein the processor is further configured to receive an updated infrastructure map.

27. The customer device of claim 26, wherein the updated infrastructure map comprises adaptations based on a congestion and traffic report.

* * * * *